UNITED STATES PATENT OFFICE.

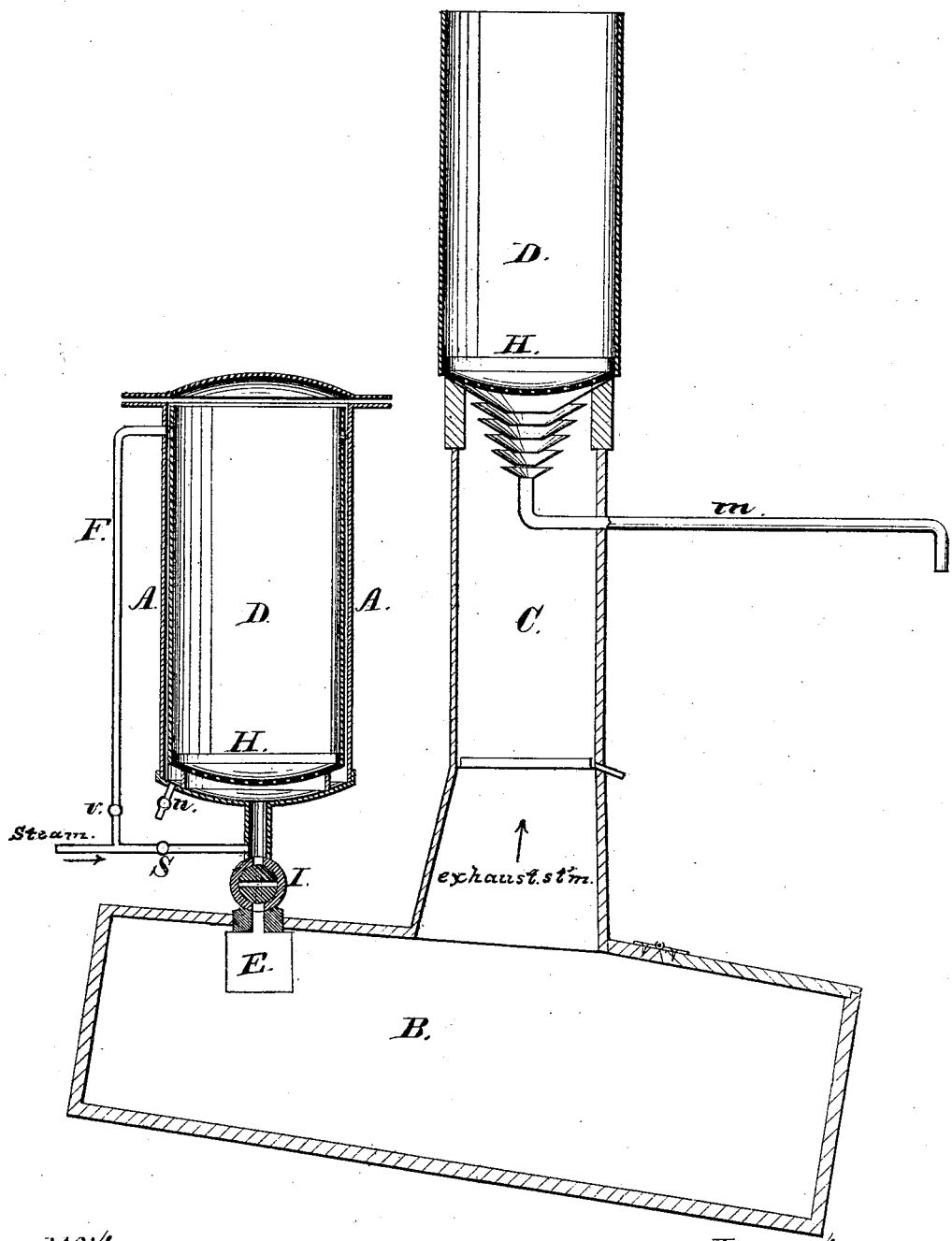

AZEL STORRS LYMAN, OF NEW YORK, N. Y.

IMPROVEMENT IN SEPARATING GELATINE AND MEAT FROM BONES AND RENDERING LARD AND TALLOW.

Specification forming part of Letters Patent No. 181,695, dated August 29, 1876; application filed July 16, 1875.

*To all whom it may concern:*

Be it known that I, A. S. LYMAN, of the city, county, and State of New York, have invented an Improved Process of Separating Gelatine, Fat, and Meat from Bones and Rendering Tallow and Lard, also revivifying bone-black, of which the following is a specification:

This invention consists in heating the bones under pressure, and then suddenly removing the pressure from them to such an extent that a portion of the water in them shall be suddenly converted into steam, and press the gelatine and fat before it out of the bones. A portion of the water in the fat-cells is also suddenly flashed into steam, bursting each of the little membranous cells and setting free the fat contained in them. When used for revivifying animal-charcoal it washes out the foreign matters that have been deposited in its pores.

The apparatus for carrying out this invention may be made in many forms. A vertical section of a good form which I have used is shown in Figure 1. It consists of a strong iron cylinder, A, with a movable top, and connected, by the pipe F near the top and S at the bottom, with the steam-boiler. (Not shown.) Its lower end is made conical, and terminates with a large discharge-cock, I, at the lowest point. There is also a large reservoir, B, below, for receiving the discharged products, with a large pipe, C, extending upward from it, for conducting off the escaping steam.

When extracting gelatine from bones and cleaning off their meat for food, I use two light cylinders, D and D, which can be let down into and hoisted out of the strong outer cylinder. The light cylinders have bottoms H and H, pierced full of holes to allow the free escape of gelatine and meat, while it keeps back the bones.

Any large hard bones which we wish to save for ivory we cut in two, if they have not been already opened, so that the water and fat can freely escape from within.

Fill the light cylinders D and D, and place one of them, as shown, in the strong cylinder A A. Place on the cover, bolt it down, and let in steam by the pipe F. The water condensed in heating the cylinders runs down into the groove $n$ at the bottom, and off by the tube, without being mixed with and diluting the gelatine. The air in the cylinder, being heavier than steam, is allowed to escape by the lower discharge-cock I. When the air is all driven out the cock I is closed, and a pressure of fifteen to thirty pounds per inch is kept up from fifteen to thirty minutes, till the bones are thoroughly heated through; then the large discharge-cock I is suddenly and fully opened. This sudden removal of fifteen or thirty pounds per inch pressure causes a portion of the water in every part of the bone to expand into steam and press the fat and a large portion of the remaining water with its gelatine before it out of the bone, and by the large discharge-cock I into the reservoir B below. If a pressure of twenty-five pounds per inch has been carried, the bones are suddenly cooled from about 270° to about 212° by the sudden evaporation of a portion of the water contained in them. An amount of water equal to about six per cent. of the weight of the bone, water, and gelatine, &c., is evaporated, generating a volume of steam in the pores of the bone that, while pressing fifteen pounds per inch above the atmosphere, equals over fifty times the whole volume of the bone, and drives before it all the fat and a large portion of the gelatine from the bone. The waste steam escapes upward by the pipe C, and is utilized in warming up the next charge, which has been placed, as shown at D, on the top of this pipe C.

After the explosion—particularly when very low pressure has been used—I sometimes let a powerful blast of steam in through the pipe F, down through the bones, and out by the valve I, for the purpose of removing any gelatine or meat that may be left between the bones.

In revivifying bone-black, first saturate it thoroughly with water by having the cylinder nearly full of water. Heat to ten or twenty pounds per inch, when the hot water softens most of the foreign matters in the little lumps, and is blown out at the bottom of the cylinder. The sudden reduction of the pressure when the steam escapes causes a slight explosion of the water in each of the little lumps, which washes it out more or less thoroughly. Repeat the process till properly cleaned.

Where the object is merely to render tallow or lard, I dispense with the inner cylinder and introduce the fat through a hole in the cover. Let steam in at the bottom pipe S, heat to twenty pounds per inch, or more, and then discharge directly into the reservoir B below, when a portion of the water in each of the little fat-cells is converted into steam, and tears open the membranous bag and drives out the fat contained in it. After remaining for a few hours in the hot water the membranes settle, while the fat rises to the surface, and may be siphoned off.

By this mode of rendering fats the ammonia and some other products of the normal waste that give the fats their peculiar rank animal smell and taste are evaporated and sent off into the air, and the lard and tallow are thus purified and freed from these filthy and unhealthy products of decay. It is believed that this lard can also be preserved much longer, having been deprived of the products of the normal waste, that act as a ferment or leaven, and cause the commencement of the process of decomposition. The lard rendered by this process is also whiter than that rendered by the ordinary processes.

When I wish to harden the lard by increasing the proportion of stearine in it, instead of buying stearine at a high price and mixing it with the lard, as by the common process, I prefer to separate a portion of the oleine, and sell it by itself as lard-oil.

I claim—

1. The mode of removing the gelatine, fat, and meat from bones by first heating them under pressure, and then suddenly reducing the pressure around them to such an extent that a portion of the water shall be flashed into steam, and press the gelatine and fat before it out of the bone, and remove the meat, substantially as specified.

2. Heating the bones under pressure, and then suddenly reducing the pressure around them to such an extent that a portion of the water shall be flashed into steam and press the gelatine and other animal matter before it out of the bone, and then removing any gelatine remaining on the surface of the bones by passing a current of steam downward through them, in the manner substantially and for the specified purposes.

3. Rendering tallow and lard by heating it under pressure, and then suddenly reducing the pressure around it to such an extent that a portion of the water contained in each of the little membranous cells shall be flashed into steam, and rupture the cell and force out the fat contained in it, in the manner substantially and for the purposes specified.

4. Heating the bones, then removing the pressure and sending a current of steam down through them, for the purpose of washing off the gelatine that has been driven out from them by the sudden flashing of water into steam into them, substantially as specified.

AZEL STORRS LYMAN.

Witnesses:
EDWARD M. LYMAN,
GEORGE CRITTENDEN, Jr.